United States Patent Office 3,391,062
Patented July 2, 1968

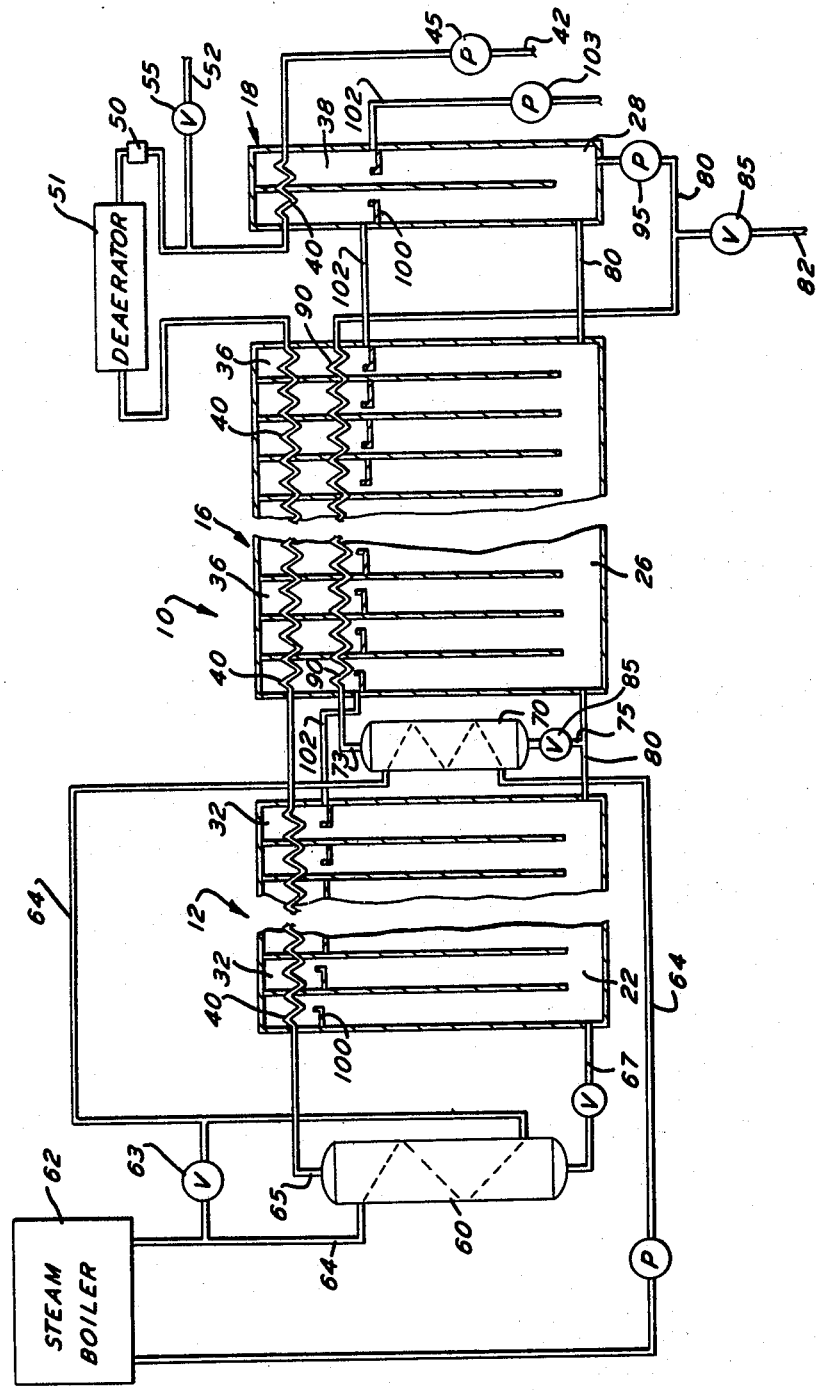

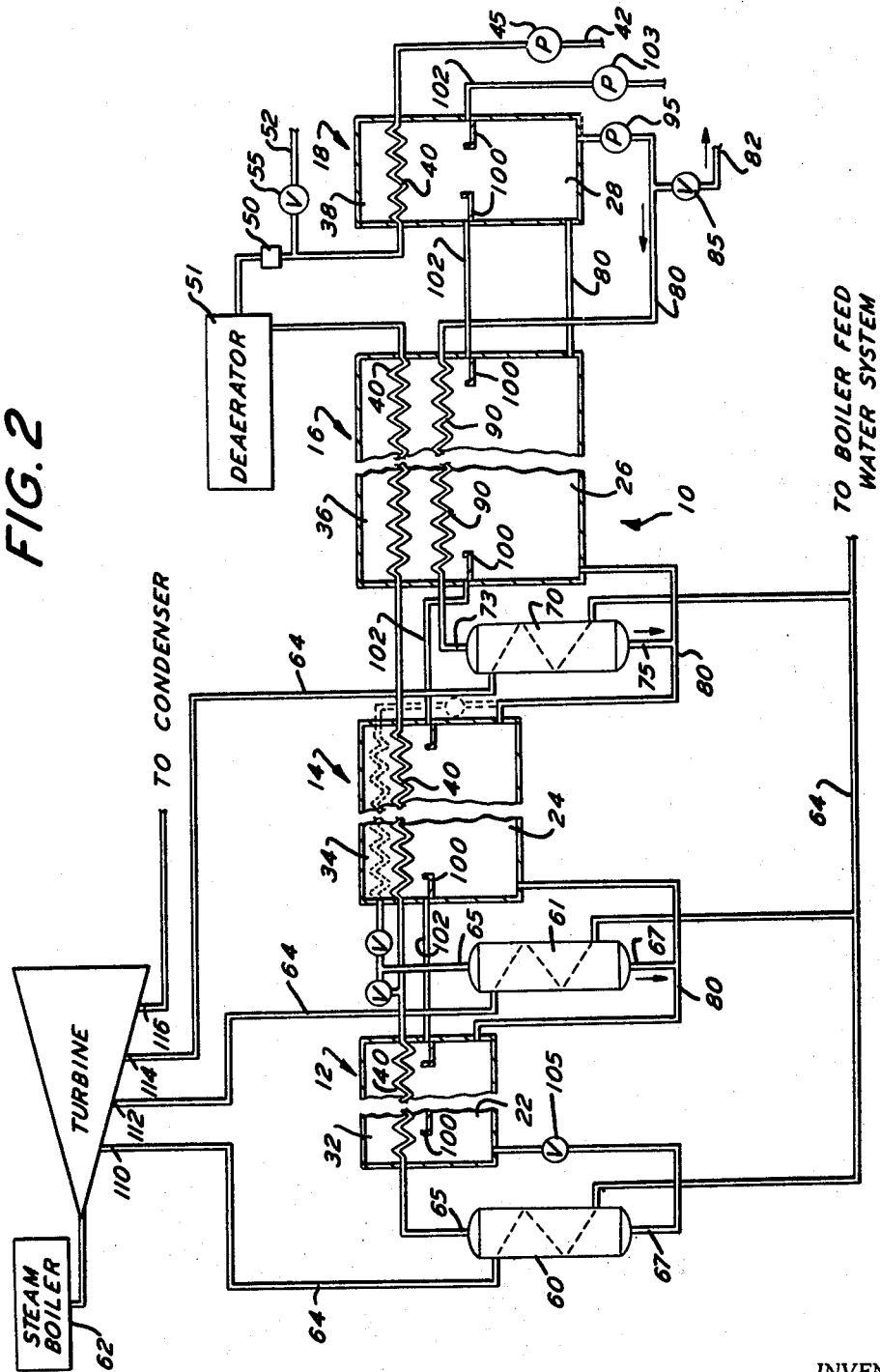

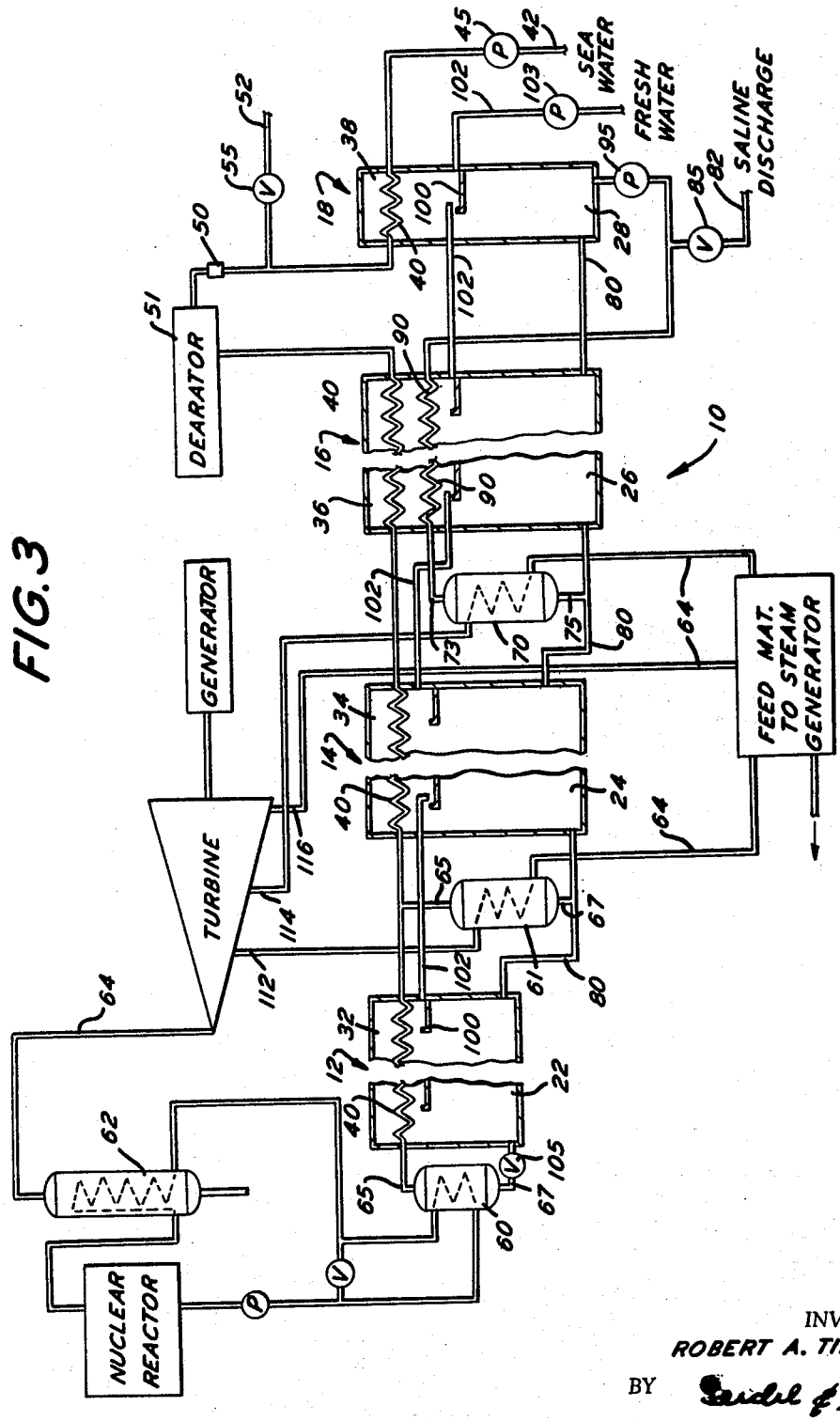

3,391,062
RECIRCULATING MULTISTAGE FLASH EVAPORATOR APPARATUS AND METHOD
Robert A. Tidball, Swarthmore, Pa., assignor, by mesne assignments, to Baldwin-Lima-Hamilton Corporation, Philadelphia, Pa., a corporation of Delaware
Filed Apr. 21, 1965, Ser. No. 449,778
5 Claims. (Cl. 203—11)

ABSTRACT OF THE DISCLOSURE

An apparatus and method for distilling sea water by flash evaporation wherein sea water is chemically treated to elevate its nonscaling temperature limit and then evaporated in a series of stages to yield a distillate and concentrated brine, and wherein the concentrated brine is reheated to its nonscaling temperature limit, and interjected into the evaporation stage having a temperature of about its nonscaling temperature limit.

---

This invention relates generally to the distillation of sea water and more particularly to an improved flash distillation apparatus therefor.

The oceans of the world are now being looked upon as vast perpetual resource reservoirs out of which potable water may be extracted. Multistage distillation plants are being constructed in conjunction with steam electrical power plants to utilize heat energy heretofore wasted. Nuclear power plants are being developed as a cheap source of heat energy and power.

Extraction of potable water in multistages and at extreme high temperatures is the most practical, efficient and economical means known. Unfortunately, maximum temperatures are limited by the scaling characteristics of salt water at high temperature due to the presence of certain salts such as calcium carbonate, magnesium hydroxide, and calcium sulphate. Well-known modern chemical treatment of the sea water will eliminate scale to a maximum temperature of about 300° F. Sea water is increasingly concentrated as it is evaporated through multiple flash stages. The resulting brine concentrate has a maximum nonscaling temperature somewhat lower than the original treated sea water, however, the maximum temperature limit of the brine does not decrease in the same proportion as the concentration increases, because the required temperature for flashing varies with brine concentration. Thus, the brine concentrate may be reheated between stages to provide a smaller temperature differential between the stages and thereby materially increase output and overall efficiency.

Therefore, to provide the foregoing and overcome difficulties of the prior art, the general object of this invention is a new and improved method of extracting potable water from sea water.

It is an object of this invention to increase the efficiency of a multistage flash distillation plant by maintaining smaller temperature differentials between stages.

A further object of the invention is to add heat energy at various stages of a multiple stage evaporation process in accordance to the respective maximum nonscaling temperature limits for various brine concentrate occurring in the process.

It is an object of this invention to materially increase the output and overall efficiency of a multistage flash distillation plant.

Another object is to provide a multistage flash distillation plant which may be utilized in conjunction with electrical power generation, for instance, a nuclear power generator, whereby a sufficient magnitude of heat load may be maintained to obtain practical efficiency in a combination plant.

Other objects will appear hereinafter.

For the purpose of illustrating the invention, there are shown in the drawings forms which are presently preferred; it being understood, however, that this invention is not limited to the precise arrangement and instrumentalities shown.

Other objects and a fuller understanding of the invention may be had by referring to the following description of claims taken in conjunction with the accompanying drawings in which:

FIGURE 1 is a schematic diagram of a simplified version of an improved flash distillation system.

FIGURE 2 is a schematic diagram of a more complex version of the invented flash distillation system in conjunction with a turbine-generator.

FIGURE 3 is a schematic diagram of the invention utilized in conjunction with a nuclear power plant.

Referring to the drawings in detail, wherein like numerals indicate like elements, there is shown in the figures a schematic representation of a flash distillation apparatus of the present invention designated generally as 10. Separate stages arranged in descending temperature order are indicated generally as 12, 14, 16 and 18, respectively. A multistage distillation plant may contain thirty or more stages. Therefore, the stages represented at 12, 14 and 16 may be considered to be broken apart sections of the respective hot and cold ends of each individual stage, however, it is understood that each broken apart end portion may also represent separate stages with a multiple of stages therebetween. As illustrated, these stages are separate from each other and are arranged in the usual descending temperature order with the hottest stage at 12 and the lowest, or heat rejection stage at 18. Each of the stages consists of a corresponding flash chamber 22, 24, 26 and 28 which are suitably constructed to withstand a high pressure differential. Each flash chamber has a regenerative heater section in conjunction therewith indicated at 32, 34, 36 and 38. A condenser conduit 40 extends through the regenerative heater sections 32, 34, 36 and 38 and communicates at one end to a supply conduit 42 and supply pump 45 to provide a flow of sea water therethrough.

An outlet conduit 52 controlled by the outlet valve 55 is provided in condenser conduit 40 at the hot end of the heat rejection stage 18 to provide a sea water return thereat. Sea water continuing in condenser conduit 40 is treated by adding chemicals through an injection nozzle 50. Entrained gas is removed by deaerator 51.

An external heater 60 is provided at the high temperature end of the stages to raise the treated sea water to its non-scaling temperature limit. Heat is provided at the external heater 60 by means of steam from boiler 62 through the steam line 64. The heater inlet 65 is connected to the uppermost end of the condenser conduit 40 as shown. The heater 65 has a valve-controlled outlet 67 communicating with the flash chamber 22 corresponding to the highest temperature stage.

Brine collecting and cascading means is provided by the brine conduit 80 which communicates between the various flash chambers as shown. The final collection of the brine concentrate is effectuated at the lowest temperature end of the system at the heat rejection stage 18. The brine collected may be discharged to waste through the discharge conduit 82 in desired amounts controlled by the control valve 85.

Intermediate stage 16 also includes a separate recirculating condenser conduit 90 which communicates with the brine conduit 80 at one side of the control valve 85. The recirculating pump 95 provides a re-circulating head to supply a stream of brine to the recirculating condenser conduit 90.

The auxiliary heater 70 is provided between stages at the hot end of the intermediate stage 16. Heat is supplied to the auxiliary heater 70 by means of the steam line 64 through a heat-control valve 63. The hot end of the recirculating condenser conduit 90 communicates to the heater 70 at the inlet 73. The recirculated and reheated brine concentrate leaves the heater 70 through the valve controlled outlet 75 which communicates with the brine conduit 80.

The distillate collecting means may be any of the conventional devices for collecting the condensate droplets and are shown as typical distillate collectors 100. Distillate conduits 102 are provided between stages to cascade distillate collected from stage to stage, as shown. The collected distillate may be pumped to a storage reservoir by pump 103.

FIGURES 2 and 3 illustrate the provision of an extra external heater 61 between stages 12 and 14 corresponding to the highest temperature end of the stages. FIGURE 2 also shows an optional recirculation addition in phantom. The optional recirculation presents a means of forced recirculation of brine by a pump through stages 14. This can offer better economy in heater-steam, depending upon steam turbine load characteristic and resultant extra energy availability in line 64.

Reference is made to FIGURE 1 for basic operation of the invented flash evaporating and distilling system. A supply of sea water is pumped through the supply conduit 42 by supply pump 45 to the condenser conduit 40. A desired amount of heat from the heat rejection stage 18 may be absorbed and dissipated by passing sea water through the condenser conduit 40 and discharging it through the outlet conduit 52 and outlet valve 55. A desired amount of the slightly preheated sea water may be treated to provide a high non-scaling temperature limit. Chemicals known to provide a nonscaling temperature limit of approximately 300° F. are mixed with the preheated sea water in desired amounts by injection through a conventional mixing nozzle 50. The sea water continues through the deaerator 51 where entrained gas is removed. The sea water continues in the condenser conduit 40 through various regenerative heater sections 36, 34 and 32 to the external heater 60 where sufficient heat is added to bring the sea water to its nonscaling temperature limit. The super heated sea water passes from the outlet 67 to the first flash chamber 22 of a series. The sea water is flashed and vapor therefrom is condensed on the condenser conduits 40, giving up heat thereto. The brine concentrate remaining in the bottom of flash chamber 22 collected in brine conduits 80 and cascaded in descending order through a series of separate flash chambers 14, 16 and 18 where it is reflashed under different temperature-pressure conditions. A portion of the brine concentrate collected at the final stage 18 may be discharged to waste through discharge conduit 82 and control valve 85. The remaining portion of brine distillate has a temperature somewhat higher than that of the sea water source, and is recirculated by means of the circulating pump 95. The brine concentrate flows through the recirculating condenser conduit 90 passing through the regenerative heater section 36 of the intermediate stage 16 to absorb heat given off by condensing vapors therein. The additional heat required to bring the brine concentrate to its nonscaling temperature limit may be provided by the auxiliary heater 70. It being understood that additional heat for this purpose is available in the next adjoining hotter section and that the recirculating condenser conduit could be extended thereinto a sufficient distance to acquire the required additional heat. However, it is much easier to control the final heating of the brine concentrate in an auxiliary heater 70 having a steam heat source controlled through a valve 63. A desired amount of the super heated brine concentrate may be mixed through the valve controlled outlet 75 with the brine concentrate in brine conduit 80. The interfused and reheated brine concentrate may then be flashed in the normal manner to the coldest stage 18. Since the brine concentrate contains some heat energy and is heated in the regenerative heat section 36 to a temperature near the flashing temperature of the chamber 26, only a minimal amount of heat need be added by the auxiliary heater 70. For example, the brine concentrate leaving the circulating condenser conduit 90 may be at a temperature of approximately 240° F. and may be heated in the auxiliary heater 70 to a temperature of 250° F. It may be seen that in this manner, a diminshed temperature differentiation between stages may be maintained. The condensed vapor droplets from condenser conduit 40 are collected as a distillate in the regenerative heater sections 32, 34, 36 and 38 on the distillate collectors 100. The distillate is cascaded from stage to stage by means of distillate conduits 102 and pumped to a storage reservoir by means of distillate conduits 102 and pumped to a storage reservoir by means of pump 103.

If desirable, the same type of distillation system can be used in conjunction with more than one external heater 60, as illustrated in FIGURES 2 and 3. There a minimal heat differential may be maintained between the hottest stages by means of an extra heater 61. The sea water, after passing through stage 14 in condenser conduit 40 is divided into two streams. One portion continuing onward through stage 12 to heater 60 and the remaining portion flowing directly to the extra heater 61. The brine concentrate from stage 12 is mixed with the super heated sea water from heater 61 before being flashed in chamber 14. The resulting brine concentration may be controlled by valve 105 to the sea water in heater 61.

FIGURES 2 and 3 show how the invented system may be utilized in conjunction with electrical power production to increase capacity and reduce the cost of both the power and water. In the case of a nuclear power plant as the size is increased, the cost of available energy is decreased and in very large sizes, the incremental cost of additional high level energy is reduced to a few cents per million B.t.u.'s. As shown on the figures, the steam heat source for the external and auxiliary heater may be provided by appropriate bleeder taps 110, 112, 114 and 116 connected by appropriate steam conduits. In the case of the nuclear power plant shown in FIGURE 3, the hottest section of the distillation plant could be supplied with heat from the primary heat exchange medium at the nuclear reactor as shown.

The present invention may be embodied in other specific forms without departing from the spirit or essential attributes thereof and, accordingly, reference should be made to the appended claims, rather than to the foregoing specification as indicating the scope of the invention.

I claim:

1. A multistage flash evaporating and distilling apparatus, comprising: a series of separate flash chambers having regenerative heater sections in conjunction therewith, said chambers providing separate stages arranged in a descending temperature order; a condenser conduit extending through said heater sections; an inlet means communicating between the sea water source and said condenser conduit to provide a supply of sea water thereto; means for treating said supply of sea water to provide a higher nonscaling temperature limit therefor; said treating means communicating with said condenser conduit at a lower stage; an external heater at a chamber corresponding to highest of said stages; said external heater having an inlet and an outlet communicating, respectively, with said condenser conduit and said highest temperature chamber; means for collecting and cascading a brine concentrate throughout said stages; a separate recirculating condenser conduit extending through a regenerative heater section of an intermediate stage, said recirculating condenser conduit in communication with said brine collecting and cascading means at positions upstream and downstream with relation to said intermediate stage; a recirculating pump at said downstream position to provide a flow of said brine concentrate through said recirculating condenser conduit; means for collecting a distillate from said regenerative heater sections, an auxiliary heater at a hot end of said regenerative heater section of said intermediate stages, said auxiliary heater having an inlet and an outlet in communication, respectively, with said recirculating condenser conduit at said upstream position and said brine collecting and cascading means, and a steam source in communication with said external heater, and said auxiliary heater including means for withdrawing steam in separate streams at successively lower temperature and pressure and transferring heat from said respective streams to heat the preheated sea water and brine concentrate, the high pressure steam heating preheated sea water prior to its introduction into the high pressure flash stage, and the lower pressure steam heating the brine concentrate mixture prior to its introduction into the intermediate lower pressure flash stages.

2. A multistage flash evaporating and distilling apparatus as in claim 1 wherein said steam source comprises a steam power turbine with steam conduit means in communication with spaced portions of the housing of said turbine for withdrawing steam in separate streams at successively lower temperature and pressure.

3. A method for evaporating and distilling sea water comprising the steps of preheating a sea water feed stream to a temperature above ambient temperature, chemically treating the preheated sea water to provide a nonscaling temperature limit of about 300° F., heating said seat water to said temperature limit, flashing said heated sea water in stages through a series of flash chambers at successively lower pressures to collect a distillate and a brine concentrate therefrom, recirculating and reheating a portion of said brine concentrate removed from a flashing stage to a temperature corresponding to the nonscaling temperature limit of said brine concentrate, admixing the reheated brine concentrate with brine concentrate introduced to said flashing stage, then flashing the resultant reheated brine concentrate mixture by interjection thereof into said series of flash chambers at an intermediate stage corresponding in temperature to the nonscaling temperature limit of the brine concentrate, to thereby yield a high percentage of said distillate, and withdrawing steam from a steam source in separate streams at successively lower temperature and pressure and transferring heat from said respective streams to heat the preheated sea water feed prior to its introduction into the high pressure flash stage, and the lower pressure steam heating the brine concentrate mixture prior to its introduction into the intermediate lower pressure flash stages.

4. A method in accordance with claim 3 wherein said steps of heating said preheated sea water and said brine concentrate to their respective nonscaling temperature limits comprises the further steps of withdrawing steam from a steam source, conducting said steam to a first heater to heat the preheated sea water, and then conducting said steam to a second heater to heat said brine concentrate.

5. A multistage flash evaporating and distilling apparatus, comprising a series of separate flash chambers having regenerative heater sections in conjunction therewith, said chambers providing separate stages arranged in a descending temperature order; a condenser conduit extending through said heater sections; an inlet means communicating between the sea water source and said condenser conduit to provide a supply of sea water thereto; means for treating said supply of sea water to provide a higher nonscaling temperature limit therefor, said treating means communicating with said condenser conduit at a lower stage; an external heater at a chamber corresponding to highest of said stages; said external heater having an inlet and an outlet communicating, respectively, with said condenser conduit and said highest chamber; means for collecting and cascading a brine concentrate throughout said stages; a separate recirculating condenser conduit extending through a regenerative heater section of an intermediate stage, said recirculating condenser conduit in communication with said brine collecting and cascading means at positions upstream and downstream with relation to said intermediate stage; a recirculating pump at said downstream position to provide a flow of said brine concentrate through said recirculating condenser conduit; means for collecting a distillate from said regenerative heater sections; an auxiliary heater at a hot end of said regenerative heater section of said intermediate stages, said auxiliary heater having an inlet and an outlet in communication, respectively, between said recirculating condenser conduit at said upstream position and said brine collecting and cascading means, and a steam source in communication with said external heater and said auxiliary heater for heating treated sea water in said external heater to the nonscaling temperature limit therefor and for heating recirculating liquid to its nonscaling temperature limit, said steam source being a steam power turbine, and respective steam conduits in communication with spaced portions of the housing of said turbine and said external and auxiliary heaters, said respective conduits providing steam at different temperatures to heat said preheated sea water and said brine concentrate to their nonscaling temperature limits.

References Cited
UNITED STATES PATENTS

| | | | |
|---|---|---|---|
| 2,759,882 | 8/1965 | Worthen et al. | 202—174 |
| 2,893,926 | 7/1959 | Worthen et al. | 202—173 X |
| 2,921,004 | 1/1960 | Wood | 202—177 |
| 2,979,443 | 4/1961 | Frankel | 202—173 |
| 3,119,752 | 1/1964 | Checkovich | 203—11 X |
| 3,146,177 | 8/1964 | Chalmers et al. | 202—173 X |
| 3,152,053 | 10/1964 | Lynam | 202—173 |
| 3,165,452 | 1/1965 | Williams | 202—173 |
| 3,219,552 | 11/1965 | Starmer et al. | 202—173 |

NORMAN YUDKOFF, *Primary Examiner.*

F. E. DRUMMOND, *Assistant Examiner.*